United States Patent [19]

Minchak et al.

[11] Patent Number: 4,948,856

[45] Date of Patent: Aug. 14, 1990

[54] HOMOGENEOUS ADDITION COPOLYMERS OF ETHYLENE AND CYCLOOLEFIN MONOMERS AND METHOD FOR PRODUCING SAME

[75] Inventors: Robert J. Minchak, Parma Heights; James T. Ware, Doylestown, both of Ohio

[73] Assignee: B. F. Goodrich Company, Akron, Ohio

[21] Appl. No.: 52,878

[22] Filed: May 22, 1987

[51] Int. Cl.$^5$ .................... C08F 2/02; C08F 4/622; C08F 210/02

[52] U.S. Cl. .................... 526/281; 526/165; 526/169.2; 526/283; 526/902

[58] Field of Search .............. 526/281, 282, 169.2, 526/902, 283, 165

[56] References Cited

U.S. PATENT DOCUMENTS

| | | | |
|---|---|---|---|
| 2,799,668 | 7/1957 | Anderson | 526/281 |
| 2,883,372 | 4/1959 | Stamatoff | 526/281 |
| 3,330,815 | 7/1967 | McKeon | 526/281 |
| 3,418,299 | 12/1968 | Benedikter et al. | 526/281 |
| 3,478,002 | 11/1969 | Nakaguchi | 526/281 |
| 3,494,897 | 2/1970 | Reding et al. | 526/281 |
| 3,496,129 | 2/1970 | Wismer et al. | 526/281 |
| 3,624,056 | 11/1971 | Minchak | 526/281 |
| 3,660,363 | 5/1972 | Foster et al. | 526/281 |
| 4,136,247 | 1/1979 | Tenney et al. | 526/281 |
| 4,136,248 | 1/1979 | Tenney | 526/281 |
| 4,178,424 | 12/1979 | Tenney et al. | 526/281 |
| 4,380,617 | 4/1983 | Minchak et al. | 526/281 |
| 4,426,502 | 1/1984 | Minchak | 526/281 X |

FOREIGN PATENT DOCUMENTS

| | | | |
|---|---|---|---|
| 156464 | 2/1985 | European Pat. Off. | 526/281 |
| 0203799 | 12/1986 | European Pat. Off. | 526/281 |
| 0222646 | 5/1985 | Fed. Rep. of Germany | 526/348.2 |

OTHER PUBLICATIONS

Translation of East German Patent 222,317 to Lindner et al., Published, May 15, 1985.

Polymer Processes, C. E. Schildknecht (ed.), Interscience Publishers, N.Y., (1956), pp. 31–32.

Kennedy, (Ed), Polymer Chemistry of Synthetic Monomers, Part II, Interscience Publishers, pp. 682–702, (1968).

Primary Examiner—Joseph L. Schofer
Assistant Examiner—F. M. Teskin
Attorney, Agent, or Firm—Venable, Baetjer, Howard and Civiletti

[57] ABSTRACT

The present invention provides a method for producing addition copolymers of ethylene and cycloolefin monomers of the norbornene-type, such as norbornene and tetracyclododecene. Copolymers having a uniform structure with uniform glass transition temperature values are provided by performing the copolymerization reaction in bulk with a catalyst system soluble in the cycloolefin monomers.

18 Claims, No Drawings

HOMOGENEOUS ADDITION COPOLYMERS OF ETHYLENE AND CYCLOOLEFIN MONOMERS AND METHOD FOR PRODUCING SAME

BACKGROUND OF THE INVENTION

This invention relates to a method of copolymerizing ethylene with cycloolefin monomers and the homogeneous addition copolymers obtained thereby. More particularly, this invention is directed to a copolymerization process which provides uniform ethylene/cycloolefin copolymer products with consistent property profiles. The cycloolefin monomers used herein are those referred to as norbornene-type monomers and are described more particularly below.

Methods for producing copolymers of ethylene and norbornene-type monomers are well known. Polymerization can proceed by either a ring-opening mechanism or by an addition reaction wherein the cyclic ring structure remains intact. Ring-opening polymerizations are discussed with greater particularity in U.S. Pat. Nos. 4,136,247 and 4,178,424, assigned to the same assignee as the present invention and are incorporated herein by reference for their discussion of such polymerizations. Ring-opening polymerization generally yields unsaturated linear polymers while addition polymerization yields polycycloaliphatics. In both polymerization schemes, it is desirable to produce polymers having high molecular weight monomers incorporated therein to provide good temperature resistance, i.e., high heat distortion temperatures.

To maintain either mechanism exclusive, special process conditions are utilized in each polymerization method. Different temperature ranges and catalysts are preferred for each polymerization method, respectively. It is emphasized this invention is directed to addition copolymers of ethylene and norbornene-type monomers and methods for making these addition copolymers.

Copolymers of ethylene and bicycloheptene, a norbornene-type monomer defined below, are described in U.S. Pat. No. 2,799,668 by Anderson. Anderson discloses the ratio of ethylene to bicycloheptene in the copolymers obtained can vary from small quantities of ethylene to small quantities of bicycloheptene. However, Anderson does not show or suggest addition polymerization is exclusive in the process disclosed. In addition, Anderson was unsuccessful in obtaining useful copolymers when incorporating large quantities of bicycloheptene in that these copolymers were brittle where the concentration of bicycloheptene exceeded 50 mole percent.

Stamatoff, U.S. Pat. No. 2,883,372, also discloses copolymers of ethylene and the norbornene-type monomer, dihydrodicyclopentadiene. As with Anderson, there is no indication the addition polymerization reaction is exclusive and incorporating large quantities of the norbornene-type monomer provided brittle copolymers with low glass transition temperatures.

U.S. Pat. No. 3,494,897, Reding et al., alleges in its disclosure to provide the first production of addition polymerized copolymers of ethylene and bicyclo(2.2.1-)hept-2-ene monomers wherein no ring-opening polymerization takes place in producing the copolymer. The bicyclo(2.2.1)hept-2-ene monomers fall within the scope of the norbornene-type monomers defined below. To obtain these polymers, Reding et al. discloses the use of a free radical catalyst at a temperature above 40° C. and pressures of ethylene gas of at least 500 atmospheres. This patent does not provide methods wherein high concentrations of the bicyclo(2.2.1)hept-2-ene monomer can be incorporated into the copolymer in a uniform manner. The copolymers obtained in the Examples generally have less than 10 weight percent of the high molecular weight norbornene-type monomer. Although one Example demonstrates up to 60 weight percent of the norbornene-type monomer within the copolymer, this translates to a mole ratio of norbornene-type monomer to ethylene of less than 0.5. It is desirable to incorporate higher concentrations of norbornene-type monomer into the copolymer with α-olefin.

European Patent Application No. 156464, Kajiura et al., does incorporate larger quantities of norbornene-type monomers into addition copolymers with ethylene. The addition copolymers disclosed by Kajiura et al. comprise ethylene and tetracyclododecene derivatives and other norbornene-type monomers. Kajiura et al. indicate the quantity of norbornene-type monomer within the copolymer is greater than 3 mole percent and as much as 95 mole percent of the copolymer, thereby obtaining mole ratios of norbornene-type monomer to ethylene greater than 1. These copolymers are obtained by reaction of the norbornene-type monomer and ethylene within a hydrocarbon solvent in the presence of a catalyst. Suitable catalysts comprise vanadium compounds in combination with organoaluminum compounds which are soluble in the hydrocarbon solvent. The use of large quantities of solvent is disclosed in the Examples provided by Kajiura et al. For example, volumes of 1 liter and 250 milliliters of solvent are used for about 30 to 40 grams of norbornene-type monomer. This translates to a volume ratio of solvent to norbornene-type monomer of about 25:1, where 1 liter of solution is used and a volume ratio of about 8:1, where 250 milliliters of solution are utilized.

The process of Kajiura et al. produces random addition copolymers of ethylene and the norbornene-type monomer. With the higher concentrations of norbornene-type monomer incorporated in the copolymer, higher glass transition temperatures are obtained. However, these random copolymers suffer in that the glass transition temperatures of the final products vary with minor process variations, such as the percent yield of copolymer, the concentration of cycloolefin monomer in the reaction medium and the concentration of ethylene in the reaction medium. Such variations in the property profile, particularly the glass transition temperature, is unacceptable for most commercial applications of an engineering polymer.

It is desirable to obtain a more homogenous addition copolymer of ethylene and norbornene-type monomer with compositional uniformity so as to provide consistent glass transition temperatures and good optical properties without obtaining crystallinity. A more structured copolymer, such as an alternating copolymer of norbornene-type monomer and ethylene, should not exhibit variations in engineering properties with variations in reactant concentrations. However, prior to this invention, homogeneous addition copolymers of norbornene-type monomers and ethylene, and methods for producing the same, were not available.

SUMMARY OF THE INVENTION

This invention provides addition copolymers of ethylene and norbornene-type monomers and methods for their production. The addition copolymers are substantially homogeneous in structure and composition. Alternating addition copolymers of ethylene and norbornene-type monomers are preferred.

The process of this invention comprises copolymerizing a norbornene-type monomer and ethylene in a vessel by contacting ethylene with a liquid reaction medium comprised of a norbornene-type monomer and an effective amount of catalyst and co-catalyst which are both soluble in said norbornene-type monomer. The reaction medium is maintained at a temperature within the range of about −50° C. to 40° C. The molar ratio of norbornene-type monomer to gaseous ethylene within the vessel is maintained above 90:10 and the concentration of norbornene-type monomer in the reaction medium is maintained above about 35 percent by volume.

DETAILED DESCRIPTION OF THE PREFERRED EMBODIMENT

The present invention is based on the discovery that maximizing the access of the norbornene-type monomers to the polymerization reaction sites provides homogeneous addition copolymers with consistent property profiles. It has been found low dilution of the norbornene-type monomer within the reaction medium is necessary to provide addition copolymers with the desired compositional uniformity. Dilution of the norbornene-type monomer is minimized in the process of this invention by bulk copolymerizing the monomeric species to obtain the desired addition copolymers. To accomplish this, an addition polymerization catalyst/co-catalyst system which is soluble in the norbornene-type monomer is required. With such a catalyst system, reaction takes place in the norbornene-type monomer itself, where access to reaction sites by the norbornene-type monomer is maximized.

The norbornene-type monomers that can be copolymerized in accordance with the process described herein are characterized by the presence of the norbornene group, defined structurely by the formula below.

I

More common norbornene-type monomers include norbornene itself and substituted norbornenes. Dicyclopentadienes, trimers of cyclopentadiene, tetracyclododecene and substituted species thereof, respectively, are also common norbornene-type monomers.

The common norbornene-type monomers may be described more comprehensively as those conforming to formulas II and III below,

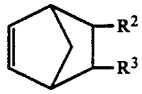

II

III wherein $R^2$ and $R^3$ are independently selected from hydrogen, halogen and alkyl groups of 1 to 20 carbon atoms or together form a saturated or unsaturated hydrocarbon cyclic group of from 4 to 7 carbon atoms with the two ring carbon atoms connected thereto.

More specifically, the common norbornene-type monomers conforming to FIGS. II and III include:
2-norbornene,
5-methyl-2-norbornene,
5,6-dimethyl-2-norbornene,
5-ethyl-2-norbornene,
5-butyl-2-norbornene,
5-hexyl-2-norbornene,
5-octyl-2-norbornene,
5-dodecyl-2-norbornene,
5-isobutyl-2-norbornene,
5-octadecyl-2-norbornene,
5-isopropyl-2-norbornene,
5-phenyl-2-norbornene,
5-p-toluyl-2-norbornene,
5-α-naphthyl-2-norbornene,
5-cyclohexyl-2-norbornene,
5,5-dimethyl-2-norbornene,
dicyclopentadiene (or cyclopentadiene dimer),
dihydrodicyclopentadiene (or dihydro-cyclopentadiene dimer),
methyl - cyclopentadiene dimer,
ethyl - cyclopentadiene dimer,
tetracyclododecene
9-methyl-tetracyclo[6,2,1,1$^{3,6}$,0$^{2,7}$]dodecene-4,
9-ethyl-tetracyclo[6,2,1,1$^{3,6}$,0$^{2,7}$]dodecene-4,
9-propyl-tetracyclo[6,2,1,1$^{3,6}$,0$^{2,7}$]dodecene-4,
9-hexyl-tetracyclo[6,2,1,1$^{3,6}$,0$^{2,7}$]dodecene-4,
9-decyl-tetracyclo[6,2,1,1$^{3,6}$,0$^{2,7}$]dodecene-4,
9,10-dimethyl-tetracyclo[6,2,1,1$^{3,6}$,0$^{2,7}$]dodecene-4,
9-methyl,10-ethyl-tetracyclo[6,2,1,1$^{3,6}$,0$^{2,7}$]dodecene-4,
9-cyclohexyl-tetracyclo[6,2,1,1$^{3,6}$,0$^{2,7}$]dodecene-4,
9-chloro-tetracyclo[6,2,1,1$^{3,6}$,0$^{2,7}$]dodecene-4,
9-bromo-tetracyclo[6,2,1,1$^{3,6}$,0$^{2,7}$]dodecene-4,
9-fluoro-tetracyclo[6,2,1,1$^{3,6}$,0$^{2,7}$]dodecene-4,
9-isobutyl-tetracyclo[6,2,1,1$^{3,6}$,0$^{2,7}$]dodecene-4,
9,10-dichloro-tetracyclo[6,2,1,1$^{3,6}$,0$^{2,7}$]dodecene-4,
cyclopentadiene trimer,
dihydro - cyclopentadiene trimer,
methyl - cyclopentadiene trimer,
ethyl - cyclopentadiene trimer, and the like.

Of the norbornene-type monomers of formula II and III, those where $R^2$ and $R^3$ form an unsaturated hydrocarbon cyclic group are often disfavored in that addition polymerization can proceed at both points of unsaturation in the monomer causing polymer cross-linking. Some cross-linking may be desired in certain addition copolymers however. It is preferable to limit $R^2$ and $R^3$ to hydrogen and alkyl groups of 1 to 3 carbon atoms.

Mixtures of norbornene-type monomers may be used when desired. The ratio of the norbornene-type monomers incorporated into the addition copolymer approximates the ratio of the norbornene-type monomers in the reaction mixture. Therefore, a ratio of 2 to 1 methyltetracyclododecene to methylnorbornene provides a polymer having monomer units of methyltetracyclododecene and methylnorbornene in a ratio of about 2 to 1 and may be slightly lower.

The norbornene-type monomer comprises a significant portion of the liquid reaction medium. The only other components required of the reaction medium are effective amounts of addition polymerization catalyst and co-catalyst which are soluble in the norbornene-type monomer. This permits reaction to occur within the volume of norbornene-type monomers, i.e., the reaction proceeds as a bulk copolymerization. Norbornene-type monomers which are liquid at the desired reaction temperature permit the exclusion of all diluent. Where the norbornene-type monomer is not liquid at the desired reaction temperature, small quantities of solvent can be used to help solubilize the catalyst/cocatalyst system and ethylene in the norbornene-type monomer. Alternatively, mixtures of norbornene-type monomers may sufficiently reduce the melting point of the solid monomers to provide a liquid medium at the desired reaction temperature. The concentration of norbornene-type monomer in the reaction medium should be maintained above about 35% by volume, i.e., the volume ratio of norbornene-type monomer to solvent should not fall below about 1:3 for the reaction medium.

When the norbornene-type monomer is diluted with solvent, the reaction is still characterized herein as a bulk copolymerization in that the catalyst is soluble in the norbornene-type monomer and the norbornene-type monomer comprises a significant portion of liquid reaction medium to provide uniform addition copolymers.

Copolymerization takes place by contacting ethylene with the liquid reaction medium to dissolve ethylene therein. Maintaining an atmosphere of gaseous ethylene above the liquid reaction medium provides sufficient dissolved ethylene for the reaction to proceed at a slow rate. Preferably, contact is enhanced by agitating the reaction medium or by bubbling (sparging) ethylene through the reaction medium. Contact is made within a vessel which retains both the liquid reaction medium and gaseous ethylene. Where ethylene is sparged, the ethylene gas which passes through the reaction medium must be removed from the vessel to permit the supply of ethylene to continue.

To control the uniformity of the copolymer, the concentration of dissolved ethylene within the reaction medium is preferably maintained substantially constant during the reaction. This can be achieved by maintaining a constant pressure of the gaseous ethylene within the vessel. This leaves only the liquid norbornene-type monomer concentration as a significant variable which affects the addition copolymerization reaction and the addition copolymer composition. Where the concentration of gaseous ethylene can not be maintained constant, it is preferable for the initial concentration of the ethylene monomer to be relatively low. A slight increase in ethylene concentration from such a low value will have only a minor effect on the homogeneity of the product. A decrease in ethylene concentration should also have little effect on homogeneity, if not an advantageous one, since the norbornene-type monomer concentration also decreases.

The molar ratio of norbornene-type monomer to the gaseous ethylene within the vessel must be maintained above about 90:10 to incorporate significant quantities of the norbornene-type monomer into the addition copolymer. Low pressures, i.e., about 1 to 10 psig, of the ethylene gas must be used to keep this ratio at a high value. Pressures of about 3 psig ethylene gas provide homogeneous addition copolymers where there is a substantial absence of solvent. Where higher concentrations of solvent are present in the reaction medium, lower pressures of ethylene gas are preferred.

The addition copolymerization catalyst and co-catalyst must be soluble in the norbornene-type monomer so as to provide copolymerization sites therein. Any vanadium compound which is soluble in the norbornene-type monomer will provide catalysis for the addition polymerization. Other known addition polymerization catalysts, such as titanium compounds, are suitable if soluble in the norbornene-type monomer. Insolubility can be detected by the formation of a ring on the surface of the reaction vessel. Vanadium compounds found to have good solubility conform to the formula below:

$$V(O)_a(OR')_b(X)_c \qquad \text{IV}$$

wherein X is halogen, R' is the hydrocarbon portion of an alkoxy group having from 1 to 20 carbon atoms, preferably having from 1 to 3 carbon atoms, a is 0 or 1, b is a whole number of from 0 to 3 and c is a whole number of from 1 to 5, subject to the proviso that were a=1 then b+c=3 and where b=0 then c is from 3 to 5.

Other vanadium compounds in combination with co-catalyst are described in Kennedy et al. Ed. *Polymer Chemistry of Synthetic Elastomers II*, p. 682–702 (1969) and Kajiura et al. in European Patent Application No. 156464, both of which are incorporated herein by reference, respectively, for their description of vanadium compounds which conform to formula IV.

Specific examples of suitable vanadium compounds include:
vanadium pentachloride ($VCl_5$),
vanadiumoxide trichloride ($VOCl_3$),
vanadium trichloride ($VCl_3$),
vanadiumoxide-diethoxychloride ($VO(OCH_2CH_3)_2Cl$),
vanadiumoxide-dimethoxychloride ($VO(OCH_3)_2Cl$),
vanadiumoxide-methoxydichloride ($VO(OCH_3)Cl_2$),
$VO(OCH_3)_3$,
$VO(OC_3H_7)Cl_2$,
$VO(OC_2H_5)_3$,
$VO(OC_3H_7)_3$,
vanadium tetrachloride, $VCl_4$,
vandium (III)-acetylacetonate, $V(C_5H_7O_2)_3$
and the like.

Effective amounts for such catalysts generally range from about 0.05 to 20 millimoles per liter of reaction medium, preferably, 0.1 to 10 millimoles per liter of reaction medium. Higher concentrations of catalyst generally produce lower molecular weight product.

Suitable co-catalysts are alkylaluminum halides and alkylalkoxyaluminum halides which are soluble in the norbornene-type monomer. An effective amount of co-catalyst is generally that which provides a mole ratio of aluminum to vanadium of at least 1 and preferably not more than 30. Preferred co-catalysts conform to the formula below;

$$(X)_{a'}Al(R'')_{b'}(OR)_{c'} \qquad \text{V}$$

wherein R'' is an alkyl group of from 1 to 6 carbon atoms, R is the hydrocarbon portion of an alkoxy group having from 1 to 4 carbon atoms and X is halogen, preferably chlorine. The values for a' and b' range from 1 to 2, respectively, and the values for c' range from 0 to 1, subject to the proviso that a', b' and c' total to a sum of 3. It is important to note that these values need not equal whole numbers but may be integers.

Specific examples of co-catalysts which conform to formula V are described by Kennedy et al. in Ed. *Polymer Chemistry Synthetic Elastomers II*, p. 682–702 (1969) and Kajiura et al. in European Patent Application No. 156464, both of which are incorporated herein by reference for such description, respectively. Examples include:
dimethylaluminum chloride,
methylaluminum dichloride,
diisobutylaluminum chloride,
diethylaluminum chloride,
ethylaluminum dichloride,
triethyldialuminum trichloride,
ethylethoxyaluminum chloride,
ethyldiethoxyaluminum chloride and
ethylaluminum sesquichloride.

In obtaining an effective catalyst/cocatalyst system, one of components, either the catalyst or the cocatalyst, must provide halogen to the catalyst/cocatalyst system. The preferred cocatalysts described above all contain halogen. It is emphasized that alkylaluminum and alkylalkoxyaluminum compounds which do not contain halogen can be used where the catalyst contains halogen.

The reaction medium is maintained at a temperature in the range of about $-50°$ to $40°$ C. The temperature is often dictated by the amount of catalyst precipitate or residue which deposits on the reactor walls. Higher temperatures appear to generate more catalyst residues, and may be due to over-reduction of the catalyst. The initial temperature of the reaction medium should be maintained below $20°$ C. to account for exotherms and preferably falls within the range of about $0°$ to $15°$ C. Such temperatures are easy to maintain and do not cause significant catalyst precipitation.

The copolymerization reaction slows as the catalyst activity decreases and the viscosity of the reaction medium increases with the production of addition copolymer. The rate of dissolving ethylene in the reaction medium decreases with increasing viscosity which lowers the polymerization rate. Polymerization is typically terminated before the concentration of addition copolymer formed exceeds about 25 percent by volume of the reaction medium. In that the reaction rate is very slow at high viscosities for the reaction medium, it may be desirable to terminate the reaction prior to achieving a volume of addition copolymer equal to 25% of the reaction medium, such as volumes of about 10% of the reaction medium.

As indicated above, the norbornene-type monomer may be diluted, where desired, to a minor degree without affecting the uniformity of product. A minor level of dilution is permissible in that the catalyst is soluble in the norbornene-type monomer. The volume of norbornene-type monomer within the reaction medium must be maintained above about 35% by volume to consistently provide uniform products. Although compositional uniformity may be obtained in the addition copolymers produced with norbornene-type monomers so diluted, the quantity of norbornene-type monomer incorporated in the addition copolymers is reduced and the glass transition temperature values decrease as dilution of these monomers increases.

When attempting to maximize the quantity of norbornene-type monomer incorporated within the addition copolymer, the use of solvent should be minimized to the extent the desired solubility is obtained for the catalyst system, ethylene and copolymer within the norbornene-type monomer. Other factors may make utilizing a solvent more desirable, such as the ease in handling the starting materials, reaction products, etc. The discussion of preferred conditions herein will not take into account these secondary considerations, unless specified otherwise herein.

Suitable solvents include aliphatic and cycloaliphatic hydrocarbon solvents containing 4 to 10 carbon atoms such as pentane, hexane, heptane, octane, cyclohexane, cyclooctane and the like; aromatic hydrocarbon solvents containing 6 to 14 carbon atoms which are liquid or easily liquified such as benzene, toluene, napthalene and the like; and substituted hydrocarbons wherein the substituents are inert such as dichloromethane, chloroform, chlorobenzene, dichlorobenzene and the like.

A mixture of ethylene with other gaseous $\alpha$-olefins, such as propene or butene, may be used in this invention to provide terpolymers and the like of ethylene monomers, the norbornene-type monomers and the "other" gaseous $\alpha$-olefin monomers. The use of "other" $\alpha$-olefin monomers will hinder the incorporation of the norbornene-type monomers into the addition copolymer and the ratio of total $\alpha$-olefin to norbornene-type monomer will typically increase as the quantity of the "other" gaseous $\alpha$-olefin increases, reducing the heat distortion temperatures of the addition copolymers.

The liquid reaction medium may contain polymerizable monomers other than norbornene-type monomers. Such other polymerizable monomers include non-conjugated acyclic $\alpha$-olefin monomers which remain liquid at the reaction temperatures. These polymerizable monomers will replace norbornene-type monomers in the same manner as the "other" gaseous $\alpha$-olefins and are used in limited quantities.

Of the liquid non-conjugated acyclic olefins, those preferred contain a carbon chain of 5 to 8 carbon atoms, not counting inert substituents, such as alkyl groups of from 1 to 8 carbon atoms. Examples of suitable liquid acyclic $\alpha$-olefins include 3-methyl-1-butene, 4-methyl-2-pentene, 5-ethyl-3-octene and the like, and the non-conjugated diolefin 1,6-hexadiene. The quantity of the acyclic $\alpha$-olefin is preferably maintained below 20% by weight of the total reactor contents based on the quantity norbornene-type monomer so as to maintain high glass transition temperatures of the product.

A procedure which incorporates embodiments of the present invention comprises charging a substantially oxygen free vessel with the desired norbornene-type monomer or monomers and the co-catalyst and catalyst, either independently, in any order, or together, to provide the liquid reaction medium. An ethylene atmosphere can then be applied to the vessel, preferably after the addition of the norbornene-type monomer. Ethylene may be added to the vessel before the norbornene-type monomer if the catalyst and co-catalyst are not present. Ethylene will homopolymerize in the presence of catalyst where the norbornene-type monomer is absent. Where both catalyst and co-catalyst are present in the vessel with the norbornene-type monomer, reaction commences on addition of ethylene in that the norbornene-type monomers have not been found to homopolymerize with the catalyst/co-catalyst system used herein. It should be noted that in performing this process, the catalyst and norbornene-type monomer should be isolated from air or other oxidizing atmosphere to prevent reaction and catalyst inactivation.

The reaction is permitted to proceed under the conditions for temperature and reactant concentration discussed above and the reaction can be terminated by introducing an aliphatic or cycloaliphatic alcohol of from 1 to 6 carbon atoms, such as methanol, ethanol propanol and butanol. The alcohol inactivates the catalyst. Therefore, a quantity of alcohol about equal to the molar quantity of catalyst will terminate the reaction. However, a 2 to 3 molar excess is preferred. The copolymer is recovered from the norbornene-type monomer typically by precipitation followed by filtration or decantation. Precipitation is initiated by the addition of non-solvent in a volume about equal to the volume of the reaction medium, up to about two times the volume of the reaction medium. Aliphatic and cycloaliphatic alcohols of from 1 to 6 carbon atoms are suitable non-solvents for the copolymers. Precipitation and reaction termination may be accomplished in one step by the addition of excess alcohol.

Prior to precipitation, it may be desirable to introduce antioxidant to the copolymer to prevent degradation, which causes a loss in molecular weight and/or cross-linking. Suitable antioxidants are hindered phenols such as 4-n-butyl-2,6-di-tert-butylphenol. The polymers which precipitate are of a high molecular weight (HMW). It has been discovered additional product can be obtained by evaporating off volatiles in the reaction medium, including any solvents used and the norbornene-type monomer. The residues, once washed with alcohol, comprise copolymer of a low molecular weight (LMW).

The vessel utilized is one which can withstand the reaction temperatures recited herein, excludes air from the reaction medium and preferably minimizes the loss of gaseous ethylene. An agitation means within the vessel is also preferred, but not necessary. Such agitation means may include an impeller positioned within the vessel equipped with (or without) baffles. Alternatively, an ethylene gas sparger can be used to provide agitation. It should be recognized that the process of this invention can be performed continuously or semi-continuously where the vessel used for reaction contains the required feed streams of catalyst, co-catalyst, norbornene-type monomer and ethylene. In such systems, copolymer isolation steps are preferably accomplished in a vessel other than the reaction vessel.

The addition copolymers of this invention comprise units of ethylene monomer and norbornene-type monomer defined above. The preferred addition copolymers of this invention have about 50 mole percent norbornene-type monomer units, i.e., the mole ratio of norbornene-type monomer units to ethylene incorporated in the addition copolymer is about 1:1. In that the most common structurally uniform copolymers with such a mole ratio are alternating copolymers, i.e., monomer units A and B are linked ABAB ..., such addition copolymers are most preferred. However, it is to be understood that homogeneous addition copolymers having values for the norbornene-type monomer:ethylene mole ratio either above or below 1:1 can be produced and are included in this invention, such as where the repeat structure is consistent but not alternating, i.e., AABAAB ... or ABBBABBB ....

The preferred addition copolymers of this invention contain the more common norbornene-type monomers defined by formulas II and III above. Especially preferred are those recited herein in the list of specific norbornene-type monomers. The addition copolymers of this invention also include copolymers provided by the process described herein wherein two or more different norbornene-type monomer units are incorporated into the copolymer and/or an α-olefin other than ethylene is incorporated into the copolymer. The addition copolymers of this invention are distinct in that they exhibit compositional uniformity without significant crystallinity. All addition copolymers of this invention are amorphous and exhibit low crystallinity (below about 5%) as determined by x-ray diffraction. The compositional uniformity of these addition copolymers is responsible for their consistent, high glass transition temperature (Tg) values. The addition copolymers of this invention all exhibit high Tg values, typically above 100° C. For some embodiments, the glass transition temperature values have been found to be higher than those of addition copolymers with similar monomers produced by known processes. For example, addition copolymers of ethylene and methylnorbornene have exhibited glass transition temperature (Tg) values above about 120° C. and addition copolymers of ethylene and methyltetracyclodedecene exhibit glass transition temperature (Tg) values above about 200° C.

These addition copolymers exhibit good solvent resistance, chemical resistance, transparency and dielectric properties. These addition copolymers are useful as a replacement for glass such as in optical lenses, optical disks etc. and are also good as electrical insulators for wires or printed circuit boards, etc. The addition copolymers of this invention may be shaped into desired products by known techniques, such as injection moulding, compression moulding, blow moulding, etc. or by a laminating process with a two roll mill. These addition copolymers can be processed (i.e., blended, melted or transferred) with conventional process equipment such as extruders, Hobart mixers, Banbury two roll mills, etc. Additives such as antioxidants, impact modifiers, pigments, flame retardants, U.V. stabilizers, fillers, antistatic agents, etc. may be added in quantities necessary to obtain the desired additive effect. Furthermore, these addition copolymers may be blended with other synthetic resins in all proportions to obtain a property profile unique to all the components of such a blend.

In order to fully illustrate the invention described herein, the following Examples are presented to demonstrate certain aspects of the invention herein in greater detail. It is to be understood, however, that the Examples are presented for illustrative purposes and not in any sense that would limit the scope of the invention herein.

EXPERIMENTAL

Unless stated otherwise, each of the Examples below were performed according to the following procedure. Into a sealed, nitrogen filled glass bottle (about 200 ml), equipped with a magnetic stirrer and self-sealing, puncturable cap, were charged norbornene-type monomers (or solvent mixtures thereof), through the puncturable cap, with a needle. The norbornene-type monomers (or solvent mixtures thereof) were fed through the needle from a nitrogen filled graduated column of 100 ml. The quantity and identity of these monomers are more specifically recited in the Examples below.

Co-catalyst $Al_2(C_2H_7)_3Cl_3$ in toluene (about 0.5 molar) was charged into the reactor through the puncturable cap with a syringe in a quantity ranging from about 0.25 ml to about 1 ml (about 0.125 millimoles to about 0.5 millimoles). The reactor was then brought to low pressure with ethylene via a needle through the puncturable cap. The nitrogen atmosphere in the vessel was purged with a venting needle and agitation was commenced with the magnetic stirrer. The pressure value or values obtained are indicated in the Examples and were taken from a pressure regulator connected to a pressurized tank of ethylene. The pressure values given are approximate. The temperature of the the reaction medium was maintained at about 0° C. by immersing the glass bottle in an ice bath.

The reaction commenced upon the addition of VOCl$_3$ in toluene (about 0.1 molar) through the puncturable cap with a syringe in a quantity of about 0.25 ml (0.025 millimoles). The reaction was permitted to proceed from 10 to 60 minutes until the viscosity was sufficiently high to stop the magnetic stirrer. The actual time is specified in each Example. Upon completion, the hindered phenol, 4-n-butyl-2,6-di-tert-butylphenol, was added and the reaction terminated by the addition of about 30 ml methanol, which also precipitated the addition copolymer. The addition copolymer was recovered from the reaction medium by filtration, washed with from 1 to 2 volumes of about a 1:1 methanol/toluene mix, respectively, and then dried in vacuo at about 50°-60° C. for 8-16 hours. This product was weighed and determined as the yield of high molecular weight (HMW) addition copolymer. To obtain the low molecular weight (LMW) addition copolymer product, the norbornene-type monomer, toluene and methanol were evaporated and the LMW addition copolymer remained as a residue. This residue was washed and the yield of low molecular weight polymers was determined. The glass transition temperature (Tg) of the HMW addition copolymers was determined by differential scanning calorimetry (DSC) of a copolymer sample.

EXAMPLES 1-3

Consistent Tg Values from High Concentrations of Norbornene-Type Monomers

Examples 1-3 were run in accordance with the Experimental procedure described above. The norbornene-type monomer used in Examples 1-3 was methylnorbornene. The volume of the reaction medium was maintained at about 30 ml for each Example. In Example 1, no solvent was used to dilute the methylnorbornene monomer. The pressure of ethylene was about 3 psig for Example 1 with a corresponding ethylene concentration of 0.15 g in the vessel. In Examples 2 and 3, the monomer was diluted with toluene to a 20/10 and 10/20 monomer:toluene volume ratio, respectively. The ethylene pressure was maintained at about 3 psig for both Examples 2 and 3. After reaction for the time specified in Table 1, the products were recovered, weighed and the glass transition temperature values (Tg's) were determined for the high molecular weight products. The values obtained for weight recovery and glass transition temperature are shown in Table I.

TABLE I

| Example | Run Number | Monomer (mls) MNB[a] | Ethylene (psig) | Ethylene (g) | MNB[a] (Mole %) | Time (Min) | Polymer (g) HMW[b] | Polymer (g) LMW[c] | Tg[d] (°C.) |
|---|---|---|---|---|---|---|---|---|---|
| 1 | 86-22-1A | 30 | 3 | 0.15 | 98 | 29 | 1.33 | 4.53 | 129 |
| 2 | 76-7-1B | 20 | 3 | 0.15 | 97 | 17 | 1.52 | 4.40 | 122 |
| 3 | 76-8-1C | 10 | 3 | 0.15 | 94 | 20 | 3.01 | 2.36 | 122 |

[a]Methylnorbornene
[b]High Molecular Weight
[c]Low Molecular Weight
[d]Glass Transition Temperature for HMW The Tg values for Examples 1, 2 and 3 are consistent although (1) the product yields varied, (2) the ratio of ethylene to methylnorbornene varied slightly, and (3) the reaction times varied from 17 to 29 minutes.

Controls A, B and C Inconsistent Tg values and Crystallinity with Low Concentrations of Norbornene-Type Monomer Controls A, B and C were performed with low concentrations of methylnorbornene in accordance with the procedures described under the heading "Experimental". The ratio of monomer to ethylene was below 90:10 for each Control, which is below the ratio used in the process of this invention. The quantity of ethylene is also provided in Table II. The reaction proceeded for the time period specified in Table II. The products were recovered, weighed and glass transition temperature (Tg) values determined for the high molecular weight products. The values for weight recovery and Tg appear in Table II.

TABLE II

| Control | Run Number | Monomer (mls) MNB[a] | Ethylene (psig) | Ethylene (g) | MNB[a] (Mole %) | Time (Min) | Polymer (g) HMW[b] | Polymer (g) LMW[c] | Tg[d] (°C.) |
|---|---|---|---|---|---|---|---|---|---|
| A | 76-29-1A | 5 | 10 | 0.35 | 78 | 7 | 2.97 | 3.32 | 94 |
| B | 76-28-16 | 3 | 3 | 0.15 | 82 | 23 | 1.82 | 1.75 | 105 |
| C | 76-28-1A | 2 | 3 | 0.15 | 78 | 11 | 2.15 | 0.72 | (*) |

(*) Crystalline Melting Point 135° C.
[a-d]See Table I

All Controls provided addition copolymers with high ethylene concentrations, as evidenced by the low Tg values for Controls A and B and inconsistent structures for these addition copolymers is evidenced by the varying values for Tg and the crystalline melting point for Control C. The effect of high dilution is seen in the crystalline portions produced in the addition copolymer of Control C.

EXAMPLES 4-7

Consistent Tg Values with Varying Ethylene Concentration

Examples 4-7 were performed in accordance with the procedures specified under the heading "Experimental". The monomer used was methylnorbornene in quantities of 30, 20 or 10 ml. The actual quantity used is specified in Table III. Where less than 30 ml of monomer were used, toluene was added to provide a 30 ml volume for the reaction medium. The reaction for Examples 4-7 proceeded for the time specified in Table III. The ethylene pressure increased from 3 to 10 psig as the reaction proceeded for Examples 5-7. In Example 4, the ethylene pressure was constantly maintained at 10 psig. The high molecular weight (HMW) and low molecular weight (LMW) addition copolymer products were recovered, weighed and the glass transition temperature (Tg) values for the HMW copolymers determined. These values appear in Table III.

forth in Table IV. The copolymers were recovered, washed and weighed as specified under the heading "Experimental". The glass transition temperature (Tg) values for the high molecular weight addition copolymers obtained from Examples 8-10 were relatively the same, although the product yields varied from about 4.66 grams to about 2.63 grams.

TABLE III

| Example | Run Number | Monomer (mls) MNB$^a$ | Ethylene (psig)$^e$ | MNB$^a$ (Mole %)$^e$ | Time (Min) | HMW$^b$ | LMW$^c$ | Tg$^d$ (°C.) |
|---|---|---|---|---|---|---|---|---|
| 4 | 76-29-1B | 30 | 10 | 95 | 9 | 2.44 | 4.94 | 110 |
| 5 | 76-30-1A | 30 | 3 → 10 | 98 → 95 | 21 | 1.45 | 2.22 | 124 |
| 6 | 96-5-1A | 20 | 3 → 10 | 97 → 92 | 19 | 1.71 | 2.92 | 120 |
| 7 | 96-5-1B | 10 | 3 → 10 | 94 → 86 | 13 | 1.52 | 1.21 | 106 |

$^{a-d}$See Table I
$^e$Ethylene Pressure Increased from 3 to 10 psig.

These Examples show that with high concentrations of norbornene-type monomer and relatively low initial concentrations of ethylene, minor variations in the concentration of ethylene have little effect on the product obtained in that the Tg value conforms to those of Examples 1-3. It is noted similar variations have a more significant effect on the copolymer Tg values as the concentration of methylnorbornene is reduced. In addition, Example 4 shows that where the initial concentration of ethylene is high, there is a significant reduction in molecular weight compared to addition copolymers of Examples 1-3, due to greater access to the reaction sites for ethylene.

EXAMPLES 8-10

Consistent Tg Values from Minor Dilutions of Norbornene-Type Monomers

Examples 8-10 were run in accordance with the procedure set forth under the heading "Experimental". The norbornene-type monomer used was methyltetracyclododecene in concentrations of 20 ml or 10 ml. The actual concentration is specified in Table IV. The volume of the reaction medium was supplemented with toluene to provide a 30 ml total. The ethylene pressure was maintained at about 3 psig for all Examples. The reaction in each Example was run for the period specified in Table IV to provide the quantity of high molecular weight and low molecular weight copolymers set

TABLE IV

| Example | Run Number | Monomer (mls) MTD$^a$ | Ethylene (psig) | (g) | Time (Min) | Temp (°C.) | Polymer (g) HMW$^b$ | LMW$^c$ | Tg$^d$ (°C.) |
|---|---|---|---|---|---|---|---|---|---|
| 8 | 76-7-2A | 20 | 3 | 0.15 | 24 | 0 | 1.35 | 3.31 | 210 |
| 9 | 76-7-2B | 10 | 3 | 0.15 | 31 | 0 | 1.77 | 0.86 | 193 |
| 10 | 76-24-1A | 20 | 3 | 0.15 | 64 | 0 | 1.20 | 1.81 | 216 |

$^a$Methyltetracyclodecene
$^{b-d}$See Table I

EXAMPLES 11-16

Terpolymers with Proportional Concentrations of Norbornene-Type Monomers

Examples 11-16 were performed in accordance with the procedures specified under the heading "Experimental". The norbornene-type monomers used were a mixture of methylnorbornene and methyltetracyclododecene, the amount of each monomer used for each Example, respectively is indicated in Table V. Each reaction medium contained 10 ml of added toluene and the ethylene pressure was maintained at 3 psig in all of Examples 11-16. The reaction proceeded for a period ranging from 16 to 90 minutes, with the actual time for each Example specified in Table V. The addition copolymers were recovered, washed and weighed as specified under the heading "Experimental". The copolymer product yield ranged from 1.59 grams to 7.65 grams and the glass transition temperature (Tg) values for the high molecular weight addition copolymers showed a progressive decrease as the concentration of the high molecular weight methyltetracyclododecene in the reaction mixture decreased. These Examples demonstrate that terpolymers of uniform structure can be prepared and the quantity of norbornene-type monomers incorporated into the terpolymer is proportional to its concentration in the reaction medium.

TABLE V

| Example | Run Number | Monomer MTD$^a$ (mls) | MNB$^{a'}$ (mls) | Ethylene (psig) | (g) | Time (Min) | Temp (°C.) | Polymer HMW$^b$ | LMW$^c$ | Tg$^d$ (°C.) |
|---|---|---|---|---|---|---|---|---|---|---|
| 11 | 76-9-1A | 18 | 2 | 3 | .15 | 23 | 0 | 2.01 | 0.79 | 201 |
| 12 | 76-10-1A | 16 | 4 | 3 | .15 | 54 | 0 | 3.58 | — | 187 |
| 13 | 76-10-1B | 12 | 8 | 3 | .15 | 70 | 6 | 2.77 | 3.59 | 178 |
| 14 | | | | | | | | | | |
| 15 | 76-18-1A | 8 | 12 | 3 | .15 | 90 | 6 | 1.59 | — | 145 |

TABLE V-continued

| Example | Run Number | Monomer MTD[a] (mls) | MNB[a'] (mls) | Ethylene (psig) | (g) | Time (Min) | Temp (°C.) | Polymer HMW[b] | LMW[c] | Tg[d] (°C.) |
|---|---|---|---|---|---|---|---|---|---|---|
| 16 | 76-17-1A | 4 | 16 | 3 | .15 | 16 | 0 | 4.36 | 3.29 | 133 |

[a]Methyltetracyclododecene
[a']Methylnorbornene
[b-d]See Table I

While the invention has been disclosed in this patent application by reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

What is claimed is:

1. A process for preparing homogeneous addition copolymers by copolymerization of a monomer having a norbornene group with ethylene within a vessel by contacting ethylene gas with a liquid reaction medium comprised of monomer having a norbornene group and an effective amount of a halogen containing addition polymerization catalyst/cocatalyst system which is soluble in said monomer having a norbornene group, wherein the reaction medium is maintained at a temperature in the range of about −50° C. to about 40° C.;

the molar ratio of monomer having a norbornene group to ethylene within the vessel is maintained above about 90:10;

the ethylene pressure in the reaction medium is maintained above 1 psig to about 10 psig; and the concentration of monomer having a norbornene group within the reaction medium is maintained above about 35% by volume, wherein the addition polymerization catalyst of the halogen-containinig catalyst/cocatalyst system is a vanadium compound soluble in the monomer having a norbornene group and the cocatalyst of the halogen-containing catalyst/cocatalyst system is selected from an alkyl aluminum halide or an alkoxy alkyl aluminum soluble in the monomer having a norbornene group.

2. A process as in claim 1 wherein the vanadium compound is of the formula

$V(O)_a(OR')_b(X)_c$ wherein X is halogen, R' is the hydrocarbon portion of an alkoxy group having from 1 to 20 carbon atoms, a is 0 or 1, b is a whole number of from 0 to 3 and c is a whole number of from 1 to 5, subject to the proviso that where a=1 then b+c=3 and where b=0 then c is from 3 to 5, and the co-catalyst is of the formula

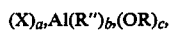

$(X)_{a'}Al(R'')_{b'}(OR)_{c'}$ wherein R'' is an alkyl group of from 1 to 6 carbon atoms, R is the hydrocarbon portion of an alkoxy group having from 1 to 4 carbon atoms, X is halogen, a' is an integer having a value ranging from 1 to 2, b' is an integer having a value ranging from 1 to 2 and c' is an integer having a value ranging from 0 to 1 subject to the proviso that a'+b'+c'=3.

3. A process as in claim 1 wherein the reaction is terminated before the concentration of addition copolymer within the reaction medium exceeds 25 percent by volume.

4. A process as in claim 1 wherein the monomer having a norbornene group is selected from monomers of the formulas

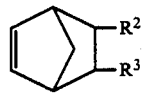

II

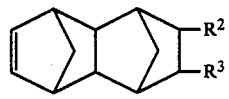

III wherein $R^2$ and $R^3$ are independently selected from hydrogen, halogen and alkyl groups of 1 to 20 carbon atoms or together form saturated and unsaturated hydrocarbon cyclic groups containing 4 to 7 carbon atoms with the 2 ring carbons connected thereto.

5. A process as in claim 1 wherein the monomer having a norbornene group is selected from the group consisting of methylnorbornene and methyltetracyclododecene.

6. A process as in claim 1 wherein at least two monomers having a norbornene group are copolymerized with ethylene.

7. A process as in claim 1 wherein the reaction medium contains an additional olefinic monomer selected from the group consisting of non-conjugated acyclic α-olefins which are substantially liquid at the reaction temperature.

8. A process as in claim 1 wherein the reaction medium is substantially free of diluent solvent.

9. A process as in claim 1 wherein the reaction medium comprises from about 10 to about 65 percent by volume of a solvent selected from the group consisting of aliphatic and cycloaliphatic hydrocarbon solvents of from 4 to 10 carbon atoms and aromatic hydrocarbon solvents containing 6 to 14 carbon atoms.

10. A process as in claim 1 wherein the pressure of ethylene gas is maintained substantially constant during reaction.

11. A process as in claim 1 wherein the copolymerization reaction is terminated before the concentration of addition copolymer within the reaction medium exceeds about 10 percent by volume of the reaction medium.

12. A process as in claim 1 wherein the vanadium catalyst is selected from the group consisting of $VCl_5$, $VOCl_3$, $VCl_3$, $VO(OC_2H_5)_2Cl$, $VO(OCH_3)_2Cl$, $VO(OCH_3)Cl_2$, $VO(OCH_3)_3$, $VO(OC_3H_7)Cl_2$, $VCl_4$ and $VO(OC_3H_7)_3$ and the co-catalyst is selected from the group consisting of $Al(CH_3)_2Cl$, $AlCH_3Cl_2$, $Al(OC_4H_9)(C_4H_9)Cl$, $Al(C_2H_5)_2Cl$ and $Al_2(C_2H_5)_3Cl_3$.

13. An alternating addition copolymer of ethylene monomer units and a monomer having a norbornene group prepared in accordance with the process of claim 1.

14. An alternating addition copolymer as in claim 13 wherein the monomer having a norbornene group is a monomer selected from the group consisting of 5-methyl-2-norbornene, 9-methyl-tetracyclo[6,2,1,1$^{3,6}$, 0$^{2,7}$]dodecene-4, 2-norbornene, 5-ethyl-2-norbornene, 5-propyl-2-norbornene, tetracyclododecene, 9-ethyl-tetracyclo[6,2,1,1$^{3,6}$,0$^{2,7}$]dodecene-4 and 9-propyl-tetracyclo[6,2,1,1$^{3,6}$,0$^{2,7}$]dodecene-4.

15. An alternating amorphous addition copolymer of ethylene monomer units and having a norbornene group, wherein the monomer having a norbornene group is selected from monomers of the formulas

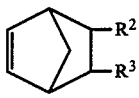
II

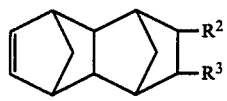
III wherein R$^2$ and R$^3$ are independently selected from hydrogen, halogen and alkyl groups of 1 to 20 carbon atoms or together form saturated and unsaturated hydrocarbon cycle groups containing 4 to 7 carbon atoms with the 2 ring carbons connected thereto.

16. An amorphous, alternating addition copolymer of claim 13 which comprises at least two different monomers having a norbornene group.

17. An amorphous addition copolymer of ethylene and methyltetracyclododecene having a glass transition temperature between about 200° C. and about 216° C.

18. An amorphous alternating addition copolymer of ethylene and methylnorbornene having a glass transition temperature between about 120° C. and about 129° C.

* * * * *